(No Model.) 12 Sheets—Sheet 1.

L. G. MERRITT.
POLYGONAL LATHE.

No. 504,812. Patented Sept. 12, 1893.

WITNESSES:
Mildred M. Nott.
H. M. Seamans

INVENTOR:
Louis G. Merritt
By Dodge, Laass & Dull
his ATTORNEYS.

(No Model.)  12 Sheets—Sheet 2.

L. G. MERRITT.
POLYGONAL LATHE.

No. 504,812.  Patented Sept. 12, 1893.

WITNESSES:
Mildred M. Nott.
H. M. Seamans

INVENTOR:
Louis G. Merritt
By Hull, Laass & Hull
his ATTORNEYS.

(No Model.)
L. G. MERRITT.
POLYGONAL LATHE.
No. 504,812. Patented Sept. 12, 1893.
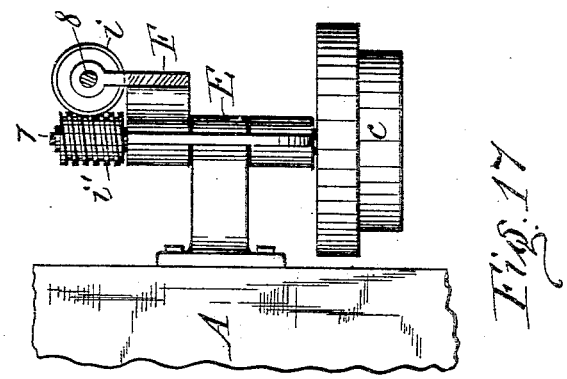
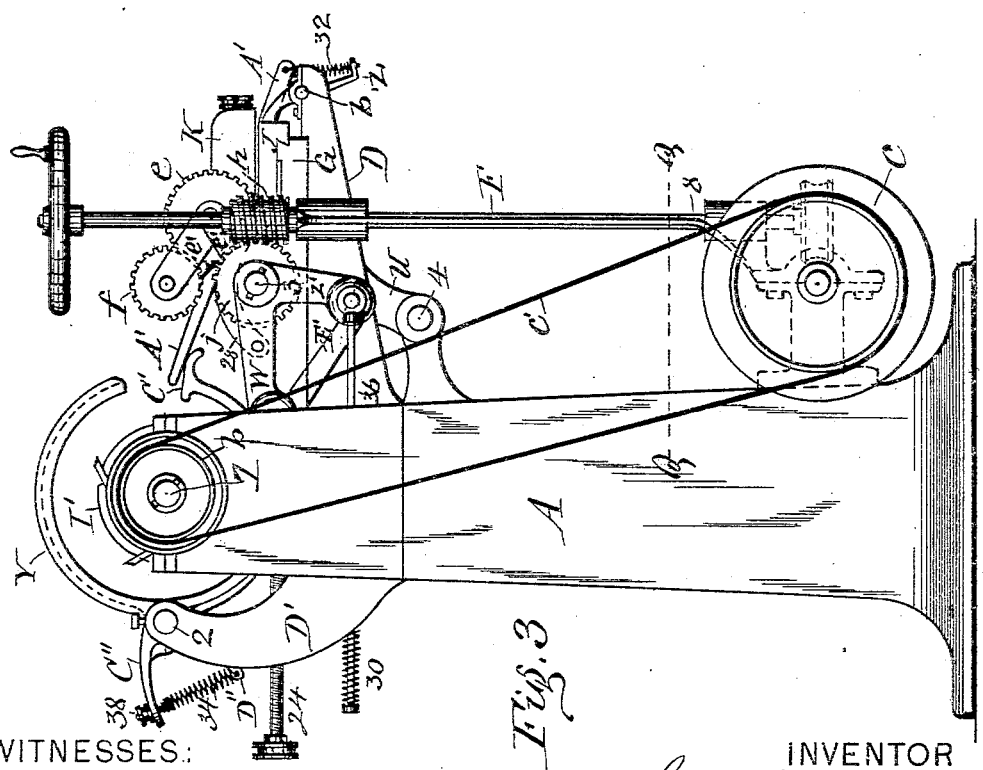
WITNESSES:
Mildred M. Nott,
H. M. Seamans
INVENTOR
Louis G. Merritt
By Duell, Loass & Duell
his ATTORNEYS.

(No Model.) 12 Sheets—Sheet 4.

L. G. MERRITT.
POLYGONAL LATHE.

No. 504,812. Patented Sept. 12, 1893.

WITNESSES:
Mildred M. Nott.
H. M. Seamans

INVENTOR:
Louis G. Merritt
By Duell, Laass & Duell
his ATTORNEYS.

(No Model.) 12 Sheets—Sheet 7.

L. G. MERRITT.
POLYGONAL LATHE.

No. 504,812. Patented Sept. 12, 1893.

WITNESSES:
Mildred M. Nott,
H. M. Seamans

INVENTOR:
Louis G. Merritt
By Duell, Lassor Duell
his ATTORNEYS (No Model.) 12 Sheets—Sheet 8.

L. G. MERRITT.
POLYGONAL LATHE.

No. 504,812. Patented Sept. 12, 1893.

WITNESSES:
Mildred M. Nott.
H. M. Seamans

INVENTOR:
Louis G. Merritt
By Duell, Laass & Duell
his ATTORNEYS.

(No Model.)

L. G. MERRITT.
POLYGONAL LATHE.

No. 504,812. Patented Sept. 12, 1893.

12 Sheets—Sheet 9.

WITNESSES:
Mildred M. Nott.
H. M. Seamans

INVENTOR:
Louis G. Merritt
By Duell, Lassett Duell
his ATTORNEYS.

(No Model.)

L. G. MERRITT.
POLYGONAL LATHE.

No. 504,812.  Patented Sept. 12, 1893.

12 Sheets—Sheet 10.

WITNESSES:
Mildred M. Nott.
H. M. Seamans

INVENTOR:
Louis G. Merritt
By Duell, Laass & Duell
his ATTORNEYS.

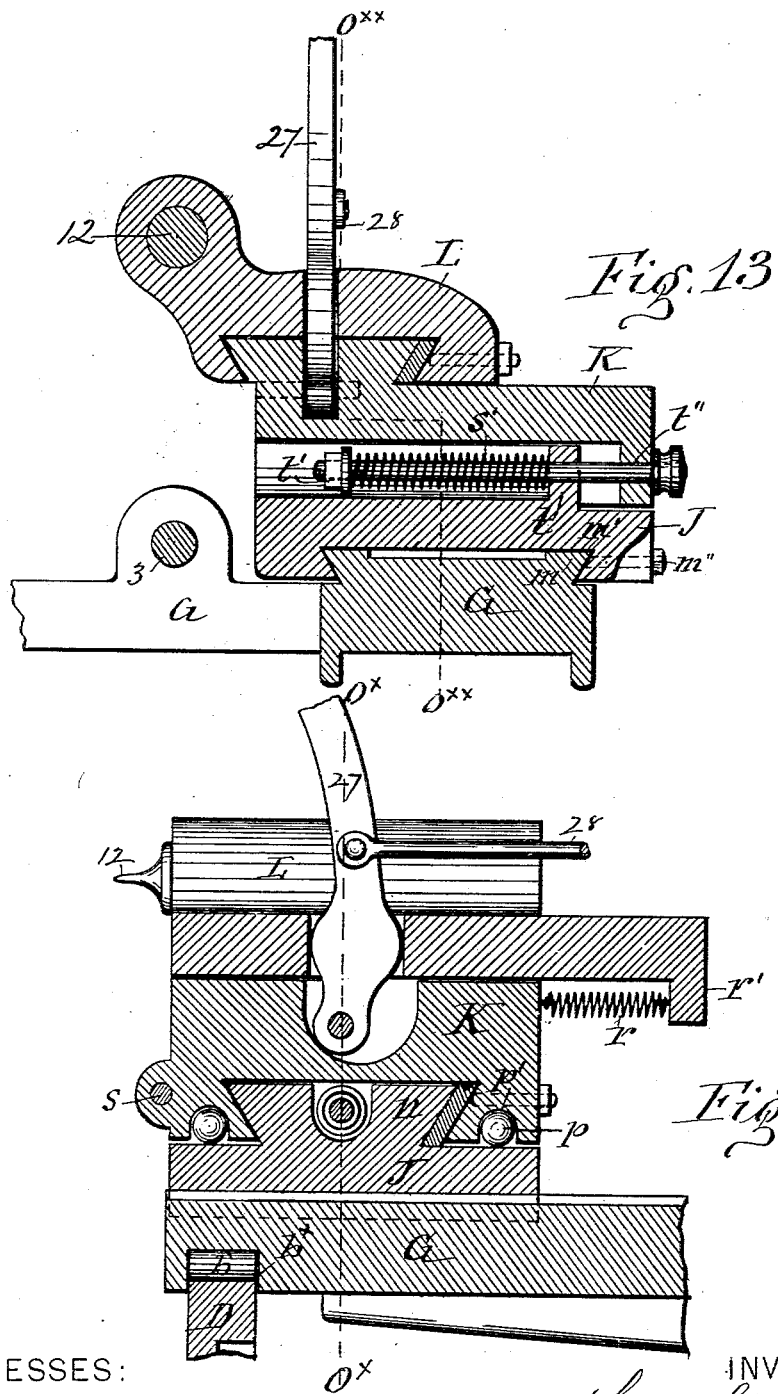

(No Model.)

L. G. MERRITT.
POLYGONAL LATHE.

12 Sheets—Sheet 12.

No. 504,812.  Patented Sept. 12, 1893.

WITNESSES:
Mildred M. Nott,
H. M. Seamans

INVENTOR:
Louis G. Merritt
By Dudly Laass & Duell
his ATTORNEYS.

UNITED STATES PATENT OFFICE.

LOUIS G. MERRITT, OF LOCKPORT, NEW YORK.

POLYGONAL LATHE.

SPECIFICATION forming part of Letters Patent No. 504,812, dated September 12, 1893.

Application filed January 31, 1893. Serial No. 460,236. (No model.)

*To all whom it may concern:*

Be it known that I, LOUIS G. MERRITT, of Lockport, in the county of Niagara, in the State of New York, have invented new and useful Improvements in Polygon-Lathes, of which the following, taken in connection with the accompanying drawings, is a full, clear, and exact description.

This invention relates to the class of lathes which are designed for turning polygonal or other irregular shapes; and the invention consists in an improved organization of a lathe which is very convenient and most efficient in its operation, all as hereinafter fully described and set forth in the claims.

Figure 1:
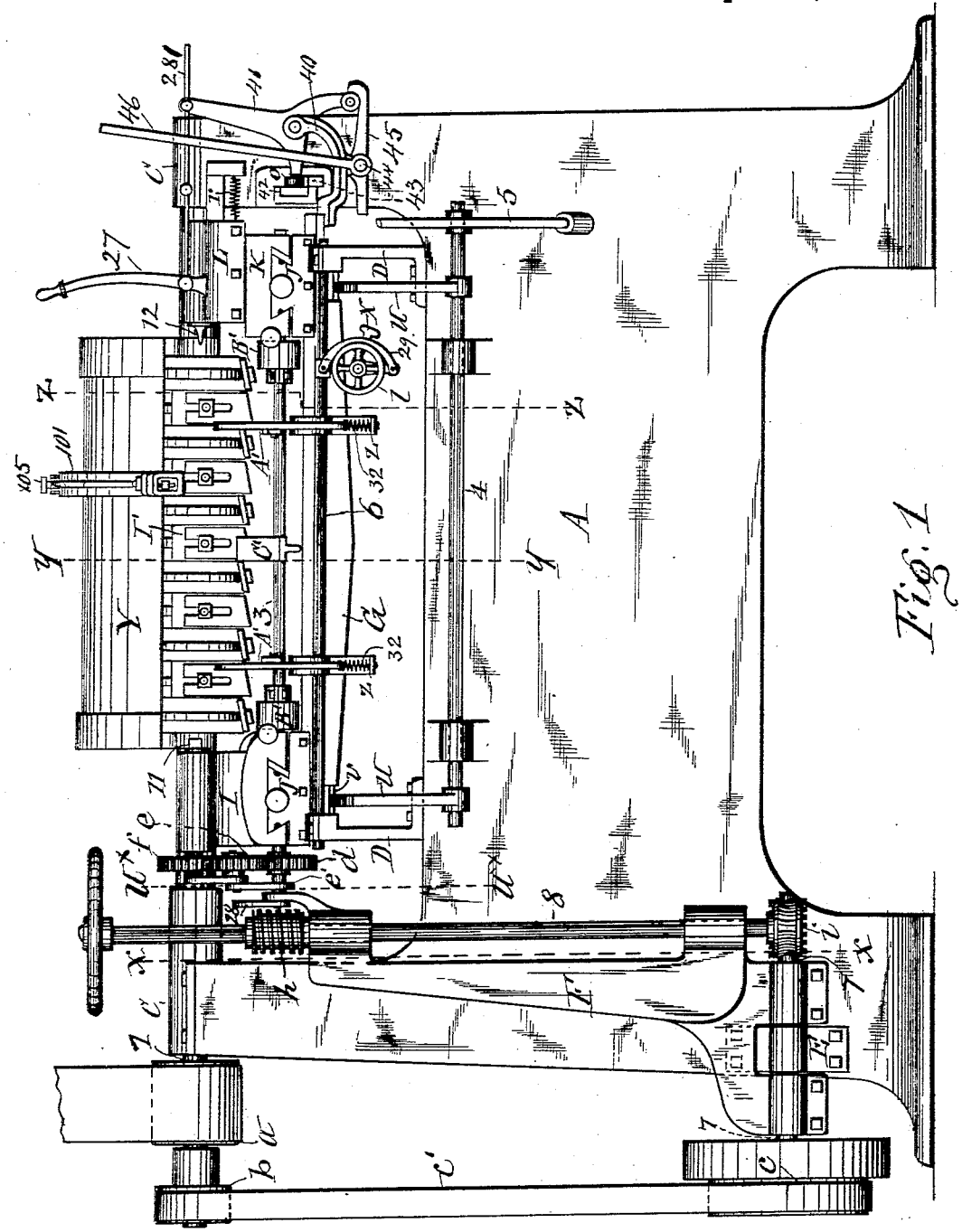
Figure 2:
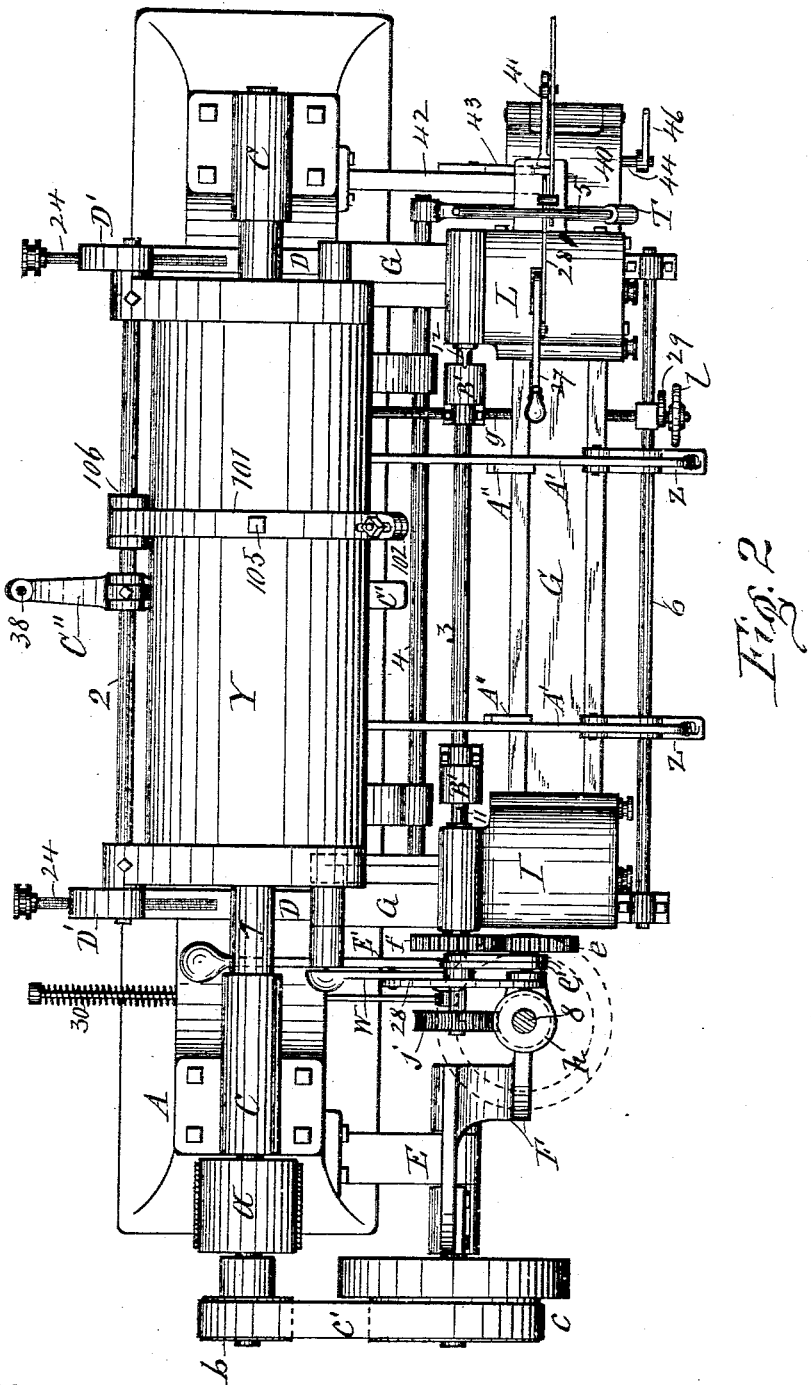
Figure 4:
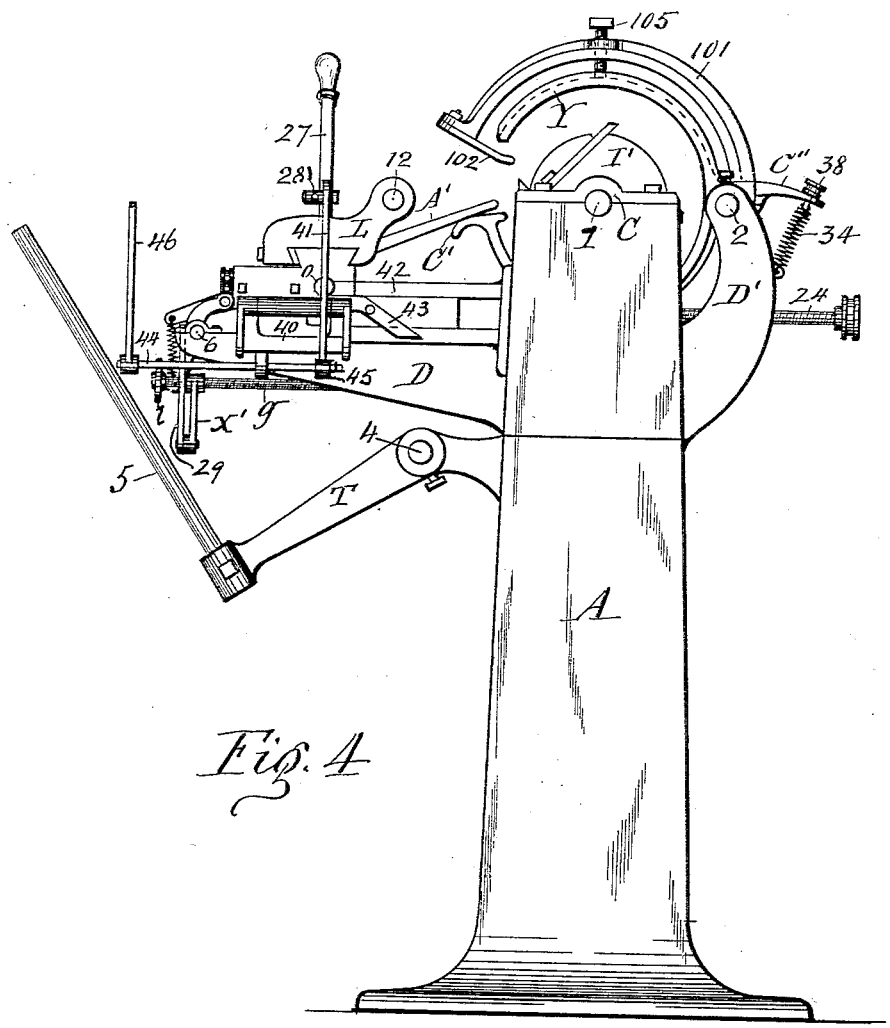
Figure 18:
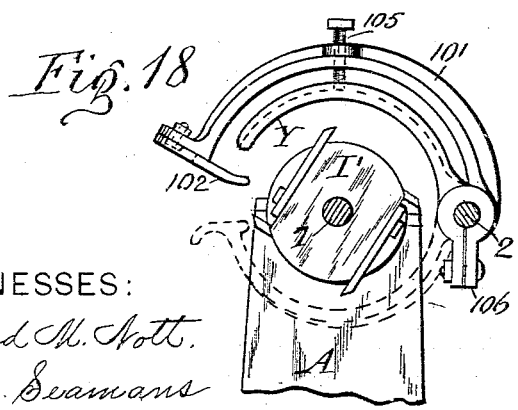
Figure 19:
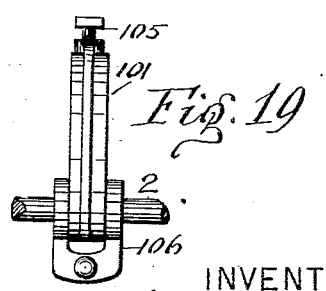
Figure 5:
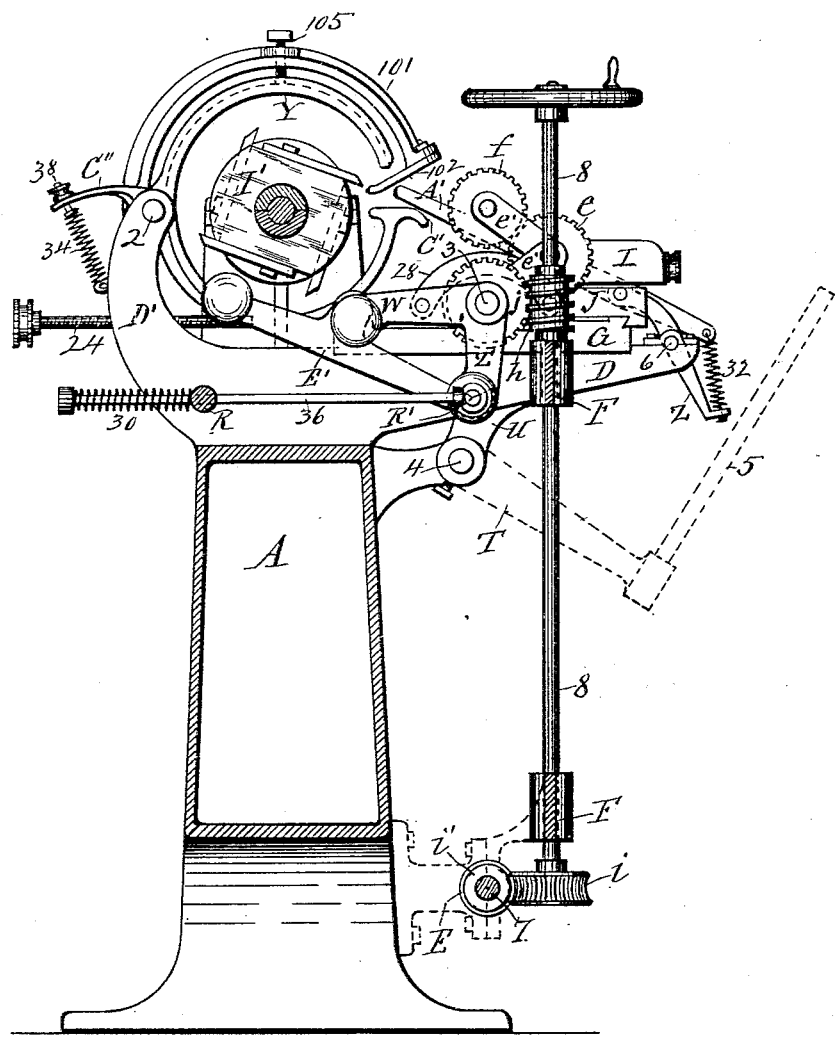
Figure 6:
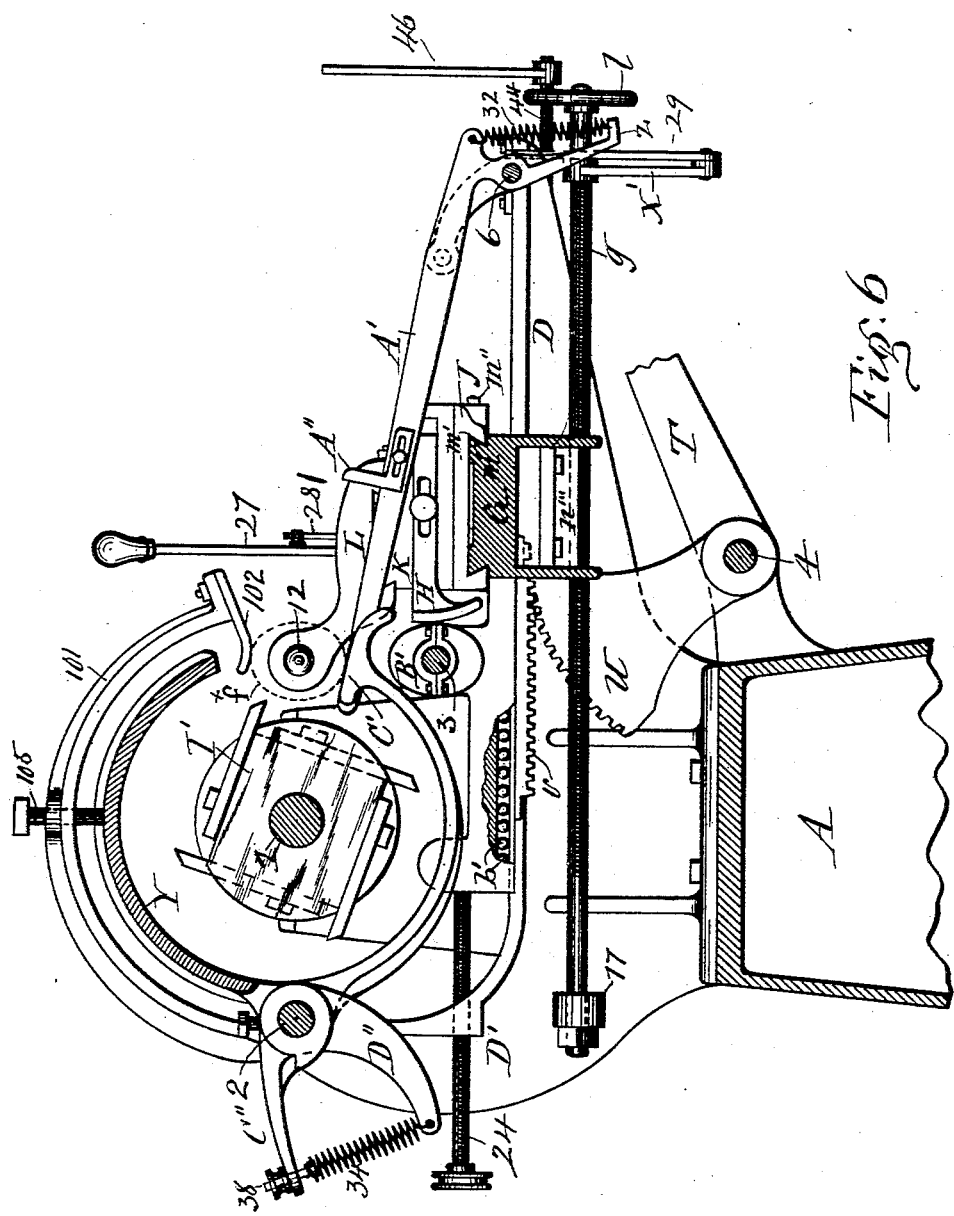
Figure 7:
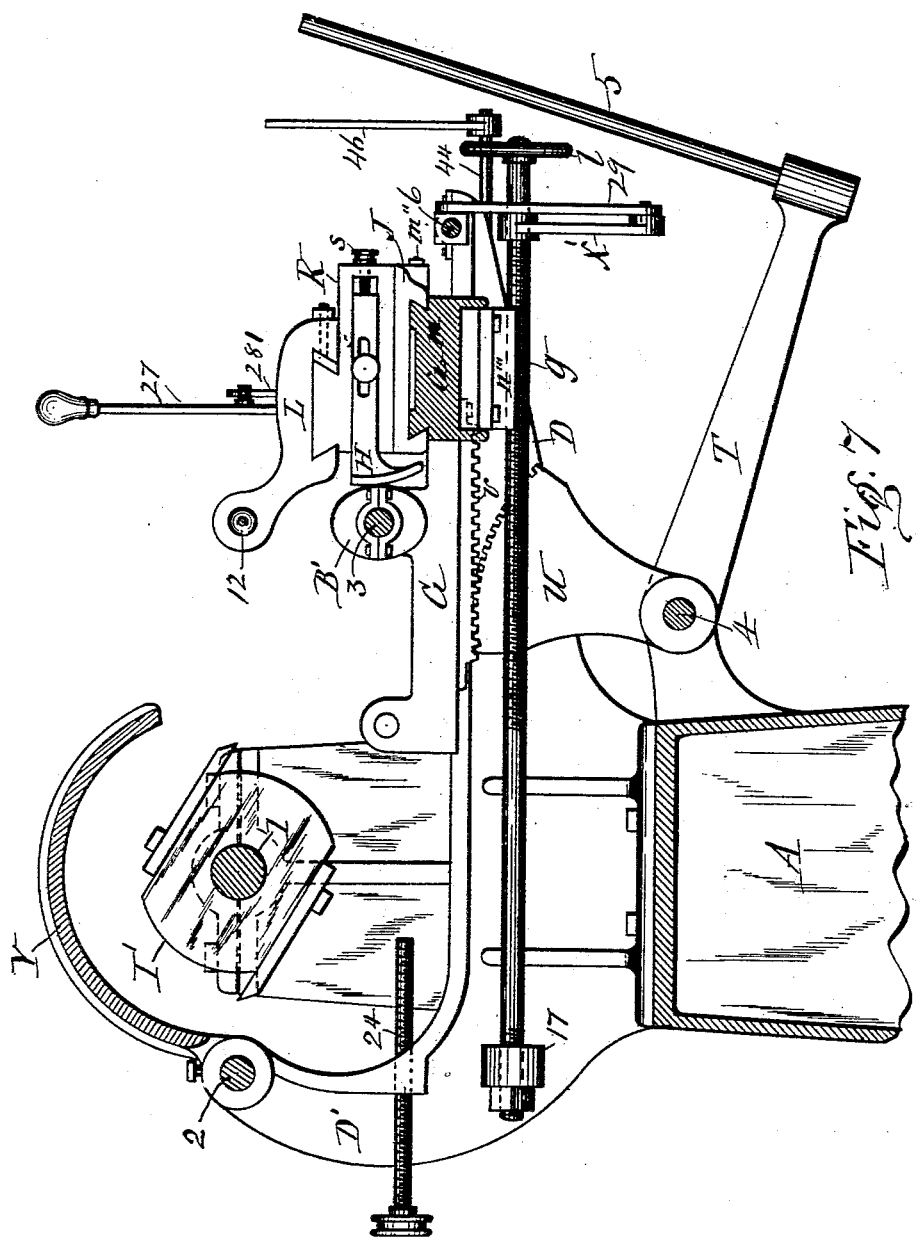
Figure 8:
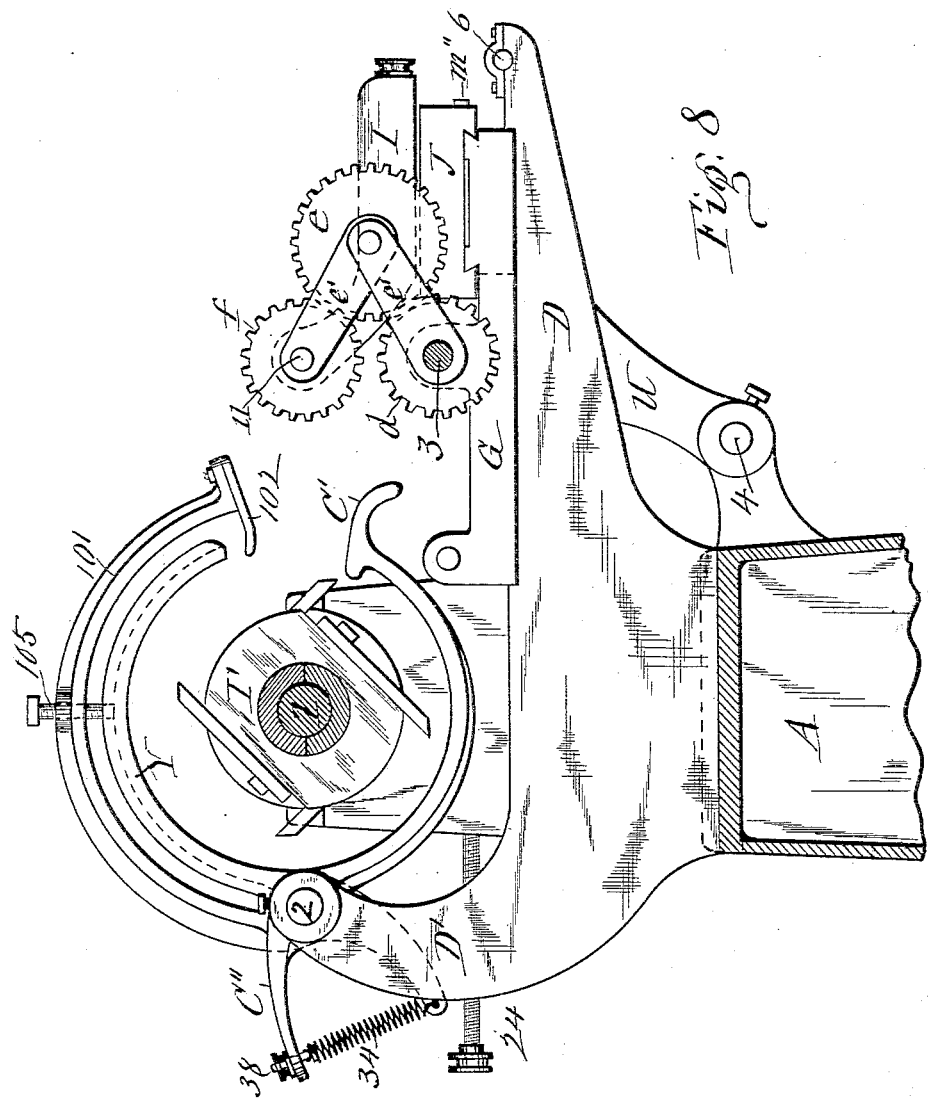
Figure 10:
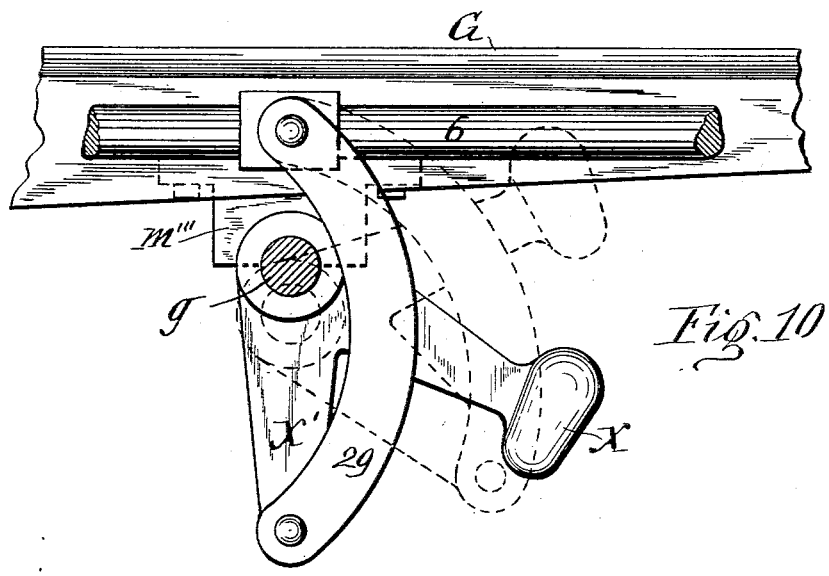
Figure 9:
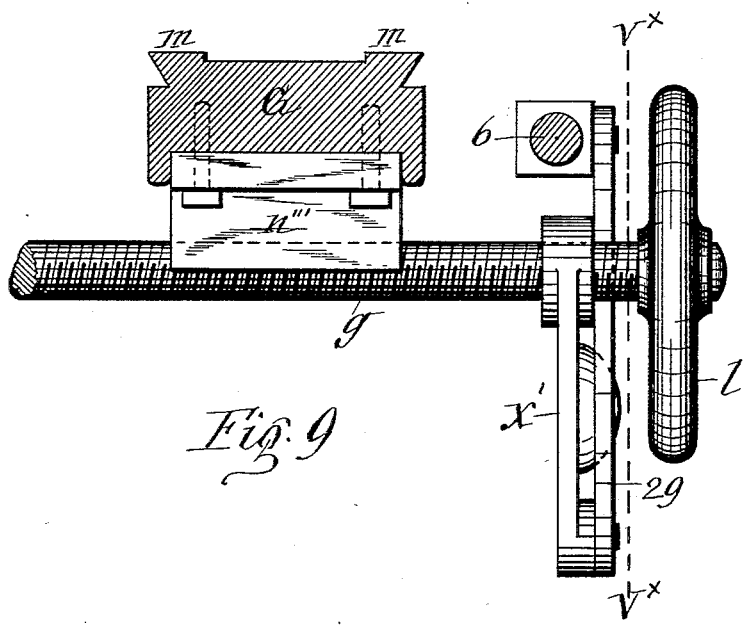
Figure 11:
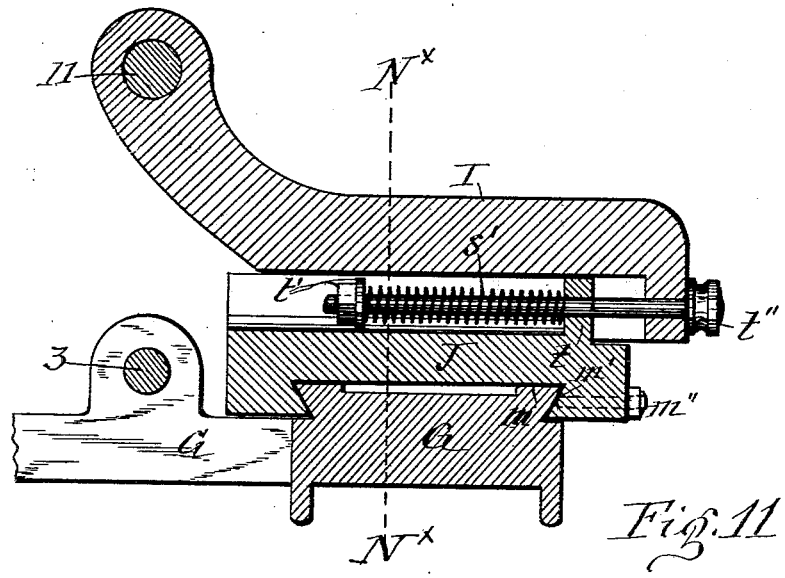
Figure 12:
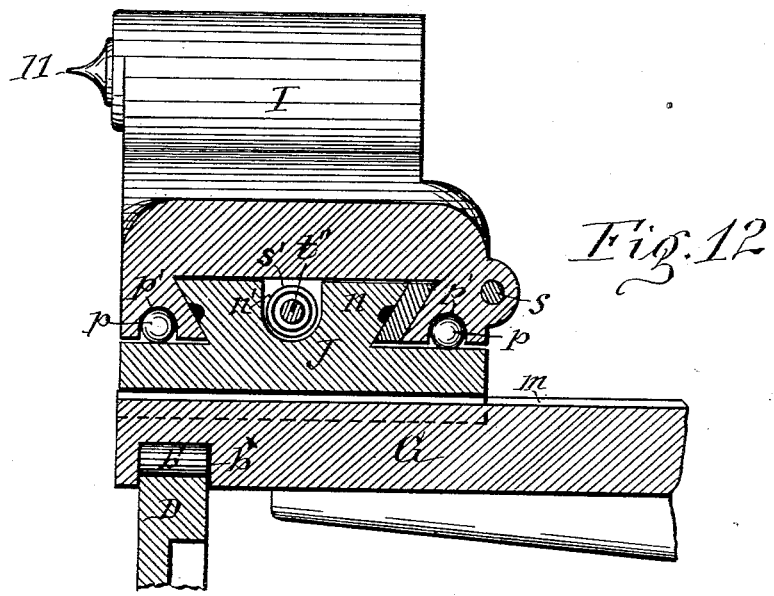
Figure 15:
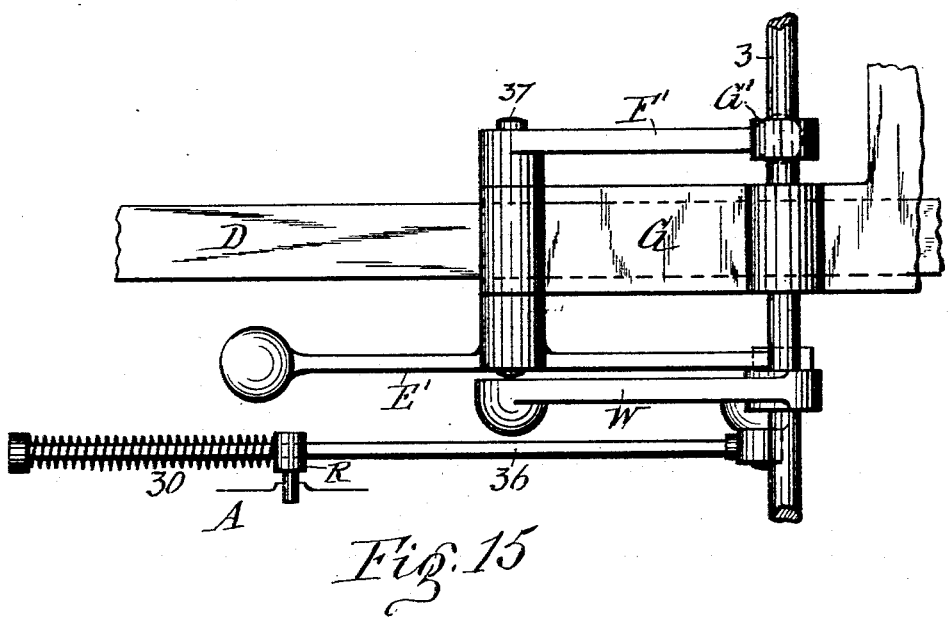
Figure 16:
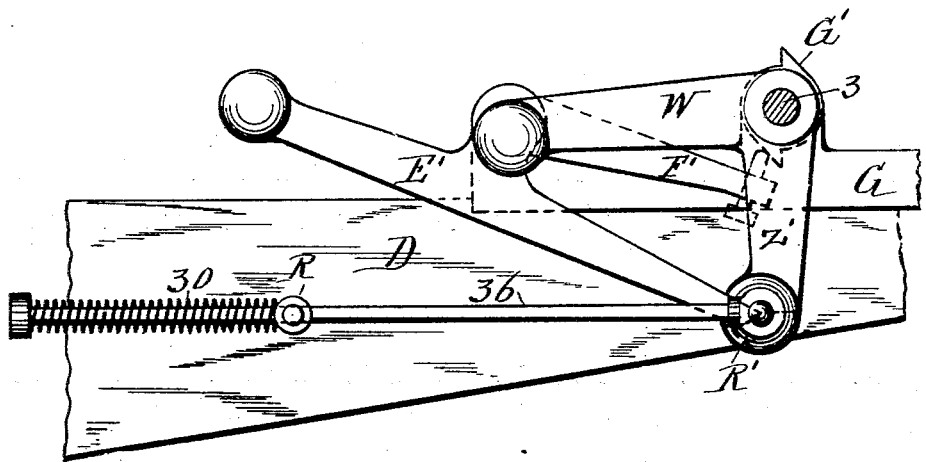

In the annexed drawings Figure 1 is a front elevation of a lathe embodying my invention. Fig. 2 is a plan view of the same. Figs. 3 and 4 are views of opposite ends of the lathe. Fig. 5 is a vertical transverse section on line $x, x$, in Fig. 1. Figs. 6, 7 and 8 are enlarged transverse sections on lines $y, y, z, z,$ and $U^\times$, $U^\times$, in Fig. 1. Fig. 9 is an enlarged side view of the feed-screw by which the work is fed to the cutters. Fig. 10 is a transverse section on line $V^\times, V^\times$, in Fig. 9. Fig. 11 is an enlarged transverse section of the feed-table with the head-block mounted thereon. Fig. 12 is a transverse section on line $N^\times, N^\times$, in Fig. 11. Fig. 13 is an enlarged vertical longitudinal section of the tail-block on line $O^\times, O^\times,$ in Fig. 14. Fig. 14 is a transverse section on line $O^{\times\times}, O^{\times\times}$, in Fig. 13. Figs. 15 and 16 are respectively a plan view and a side view of the lever which throws the cam-shaft and driving center in and out of gear. Fig. 17 is a horizontal transverse section on line $Q, Q$, in Fig. 3, and Figs. 18 and 19 are side and rear views of the attachment of the over-head rest for the work.

Similar letters and figures of reference indicate corresponding parts.

A— represents the main supporting frame of the lathe, which frame is provided at opposite ends of its top with bearings —C—C— for the arbor, 1, on which are mounted the cutter-heads —I'— equipped with cutters of the requisite shape.

D—D— are horizontal ways which are firmly secured to the frame —A— and disposed at right angles to the cutter arbor and are formed with rearwardly and upwardly curved extensions —D'— to the free ends of which is rigidly secured a horizontal shaft, 2, which carries the shield —Y— extending over the cutter-heads —I'. On the same shaft is loosely mounted the rest —C'— which extends under said cutter-heads and in front of the same to support from underneath the work while operated on by the cutters. This rest is sustained in said position by means of a downwardly and rearwardly extending finger —D''— fastened to the shaft and connected at its free end with a rearwardly extending heel —C''— on the rest —C'— by a coupling-screw, 38. A spiral spring, 34, surrounds said screw and bears with opposite ends respectively on the finger —D'— and heel —C''. The finger —D'— is secured to the shaft, 2, by means of a set-screw, so that by loosening said screw the finger, together with the rest —C'—, can be shifted longitudinally on the shaft to any desired position.

In connection with the rest —C'— I prefer to employ an over-head rest, 102, against which the work is brought to bear while subjected to the operation of the cutters. These two rests combined also serve most effectually to prevent the stick or work from being accidentally thrown back into the paths of the cutters after the work is completed and released from the tail center. The head rest 102, is adjustably attached to the front end of an arched yoke, 101, the rear end of which is mounted on the shaft, 2, and sustained laterally thereon by a clamp, 106, as shown in Figs. 18 and 19 of the drawings. To support the free or front end of the yoke, 101, at any desired elevation a set-screw, 105, passes through a screw-threaded eye in the top portion of the yoke and bears on the shield —Y. By these means the over-head rest, 102, is adjusted to different sizes of sticks to be sustained while operated on by the cutters. Said rest is further rendered adjustable by providing the yoke with a longitudinal slot for the reception of the bolt 104, by which the rest is attached to the yoke.

Upon the ways —D—D— is mounted the table —G— which is formed with horizontal extensions directly over the ways and parallel therewith to serve as prolonged bearings on said ways and thus properly support the table which carries the work, together with the revolving pattern cams, to the cutters and support the work while operated on, without subjecting said work to any part of the weight of the table. This is an important feature as it affords to the operator more perfect control of the work, and finer work can be produced. Said extensions are provided in their under sides with channels —$b^\times$— extending lengthwise thereof and of sufficient depth to contain the steel rollers —$b'$— by which the table rides on the ways —D—D— and is thus allowed to move freely back and forth. Said movement is imparted to the table by mechanism operated by the person in charge of the machine in the manner hereinafter described.

The top of the table is formed with a longitudinal guide —$m$— which is parallel with the axis of the lathe and dove-tail shaped in cross-section and upon this guide are mounted adjustably the vibratory head-block and tail-block upon which is centered the stick to be operated on by the cutters of the cutter heads —I′.

The head-block consists of two parts, viz: a base —J— and block —I. Said base is provided in its under side with a dove-tail groove —$m'$— by which it is seated on the guide —$m$— of the table and is fastened thereto by means of a set-screw —$m''$— passing through the front portion of the base —J— and engaging the table —G—. The top of the base —J— is formed with a transverse dove-tail tongue —$n$— and upon said base rides the vibrating block —I— provided with a dove-tail groove through which the tongue —$n$— passes and thus guides said block rectilineally toward and from the cutters. The block —I— is provided with the driving-center, 11, which engages one end of the stick to be operated on by the cutters, and in order to cause said cutters to impart the desired polygonal shape to said end of the stick, the block —I— is made to vibrate automatically toward and from the cutters, by means of a suitable cam —B′— which is of the shape to be imparted to the head end of the stick and is secured to a rotary shaft, 3, mounted on the table and extending lengthwise thereof, said shaft receiving motion as hereinafter described. The cam —B′— engages a shoe —H— which is adjustably secured to the block —I— by a screw passing through a longitudinal slot in the shoe so as to allow said shoe to be set different distances from the axis of the cam and thus vary the thrust of the block —I— according to the depth of cutting to be effected on the work or stick. A set-screw —$s$— connected to the block —I— and bearing on the outer end of the shoe securely retains the same in position. A suitable spring —$s'$— interposed between the base —J— and block —I— forces the latter toward the cutter-heads and thus maintains the shoe in contact with the cam —B′. In order to house and protect said spring and also allow the tension thereof to be adjusted, I provide the top of the tongue —$n$— with a longitudinal groove —$n'$— to accommodate the spiral spring —$s'$— which bears with one end on a lug —$t$— projecting from the base —J— and with the opposite end on a nut —$t'$— connected to an adjusting screw —$t''$— which passes freely through the front or outer end of the block —I— and is shouldered on the exterior thereof as shown in Fig. 11 of the drawings.

Inasmuch as it is essential to render the vibrating block —I— very sensitive in its action, I interpose between said block and its seat two series of anti-friction balls —$p$—$p$— seated in grooves —$p'$—$p'$— in the under side of the block —I— and riding on top of the base —J— at opposite sides of the guide —$n$— as illustrated in Fig. 12 of the drawings.

The tail-block which carries the dead spindle, 12, of the machine is composed of three main parts viz: the base —J—, vibrating block —K— and tail center-block —L. The base is similar to the base of the head-block and mounted in the same way on the table —G—. The vibrating block —K— is mounted on the base —J— in the same manner as the block —I— hereinbefore described, and the block —L— which carries the tail center, 12, is mounted on the block —K— movably in a line parallel with the axis of the lathe and is guided by a dove-tail tongue —$q$— on top of the vibrating block —K— entering a corresponding groove in the under side of the block —L.

The vibrating block —K— of the tail-block receives motion in the same manner as the vibrating block of the head-block, i. e., by a cam —B′— mounted on the shaft, 3, and shaped to correspond to the shape to be imparted to the tail end of the stick held between the head center 11 and tail center, 12. Said cam operates against a shoe —H— attached to the block —K— and a suitable spring holds the said shoe in contact with the cam, substantially as hereinbefore described in relation to the head block. It will be observed that, by the described arrangement of the vibrating head and tail centers with separate cams for operating them independently of each other and without imparting a corresponding motion to the table, I am enabled to produce a greater variety of shapes on sticks operated on by the cutters, and allow the table to be moved more easily and uniformly toward the cutters. This constitutes one of the salient features of my present invention. The block —L— is forced toward the head-block by means of a tension spring —$r$— connected at one of its ends to the outer end of the block —K— and at the opposite end to a shoulder or collar —$r'$— on an arm extended from the block—L.

To the block —K— is pivoted the hand-lever, 27, by means of which the block —L— can be retracted to allow the work to be introduced between the two centers of the lathe. By releasing said lever the tail center is automatically forced forward by the spring —$r$— to engage the adjacent end of the work. This dogging of the work I effect automatically by the following mechanism. To the tail end of the table —G— is attached a cradle, 40, to which is pivoted the three armed lever, 41, the upwardly extending arm of which is connected to the dogging lever, 27, by a rod, 281, which is adjustable in length according to the distance of the tail-block from the aforesaid end of the table —G. From the frame —A— projects a bridge, 42, to which is pivoted the inclined track, 43, and to the horizontal arm of the lever, 41 is pivoted a roller O by which said arm travels over the top of said track in the operation of drawing the table —G— forward or away from the cutters. The lever, 41 is thereby tilted outward and caused to retract the tail block by the rod, 281, connecting said lever with the dogging lever, 27. To the under side of the cradle, 40, is pivoted a rock-shaft, 44, to which is fastened a latch, 45, the outer end of which is provided with a shoulder engaging the lower end of the downwardly extending arm of the lever, 41, when the table —G— is drawn toward the front as aforesaid. This engagement of the lever retains the same in its before described tilted position in which it retracts the tail-block.

In drawing the table —G— to the front the motion of the head-center and cam-shaft, 3, is automatically arrested as hereinafter described and thus the work is readily introduced between the head center 11, and tail-center 12. By means of a lever, 46, attached to the shaft 44, the operator can tilt the latch, 45, so as to release the lever, 41, and allow the tail-center, 12, to spring into engagement with the adjacent end of the work. The cam —B'— I prefer to form each of two parts embracing one-half of the circumference of the shaft and provided with perforated ears for the reception of screws or bolts by which they are clamped on the shaft, said construction permitting a ready attachment and detachment of the cams and facilitating the applications of cams of different shapes.

For moving the table —G— toward and from the cutter-heads I prefer to employ segmental gears —U—U— fixed to a horizontal shaft, 4, extending lengthwise of the frame —A— and mounted in suitable bearings thereon, said gears engaging racks —V—V— fastened to the table, and by means of a suitable handle or lever, 5, attached to an arm —T— which is fastened to the shaft, 4, the person in charge of the machine imparts oscillatory motion to the gears —U—U— which transmit motion to the table by means of the aforesaid racks. A set-screw, 24, adjustably connected to the frame in the path of the table limits the movement of the latter toward the cutters.

In order to allow the work to be fed to the cutters under more perfect control of the operator when desired to produce very accurate and fine work requiring careful application to the knives, I employ a screw-shaft —g— disposed at right angles to the table —G— and journaled at its rear or inner end in a bearing, 17, pivoted to the side of the rear portion of one of the ways —D— and supported at the opposite or front end movable vertically by means of a weighted lever X, mounted loosely on the shaft and formed with a downwardly extending arm —X'—, the free end of which is pivotally connected by a link, 29, to the shaft, 6, which is above the screw-shaft and attached to the front ends of the ways —D—D—. The points of attachment of the said link are normally in a vertical line passing transversely through the center of the screw-shaft as shown in Fig. 10 of the drawings, and when in this position the weighted lever —X— by its fulcrum on the lower end of the link, 29, holds the screw-shaft 9, in engagement with a half nut —n'''— fastened to the under side of the table —G. The screw-shaft is thrown out of the half nut by lifting the lever —X— which causes the link, 29, to swing to one side and allow the screw-shaft to drop out of the nut as indicated by dotted lines in Fig. 10 of the drawings, and said shaft is again thrown into the nut by simply lifting the hand-wheel —l— attached to the front end of the shaft. The weighted lever —X— through its leverage in the link, 29, forces the screw into the nut. The described screw-feed is not thrown in until the stick to be turned reaches the knives.

The table —G— is moved forward by means of the hand-lever, 5, until the work is brought nearly up to the knives. Then by the attendant of the machine grasping the hand-wheel —l— of the screw-shaft, 9, and lifting thereby said shaft the same is thrown into the half nut. The operator thus has hold of the wheel ready to turn the screw-shaft to move the table toward the cutters. When the work is completed the operator releases the hand-wheel —l— and lifts the lever —X— and thereby throws the screw-shaft out of the nut as hereinbefore described. The table —C— is then drawn back by means of the hand-lever 3.

For centering the work in the lathe, I employ suitable work supporting arms sustained adjustably in their positions in relation to the axis of the head and tail centers 11 and 12 to convey the work in its requisite position for being dogged to said centers. Said supporting arms I preferably form of levers —A'—A'— which are inclined toward the front of the machine and at a short distance from their front ends they are pivotally mounted upon arms, z, z, adjustably connected to the shaft 6, which is rigidly secured to the front ends of the ways —D—D— or other suitable support. The arms, z, z, are formed with downward extensions, to the feet of which are connected the front extremities of the levers —A'—A'— by means of adjustable spiral tension-springs, 32. To the said levers are secured the stops or shoulders —A''—A''— adjustable lengthwise thereof so as to accommodate sticks of different sizes to be turned in the lathe. The stick being placed upon the levers and against the stops —A″— as represented in Fig. 6 of the drawings, in which "$f^\times$" denotes the stick to be turned or operated on by the cutters. The arms, z, z, are adjusted at such an angle on the shaft, 6, and the stops —A″—A″— adjusted to such positions on the levers —A′—A′— as to support the stick axially in line with the head and tail centers of the lathe, to which centers the stick is then dogged as hereinbefore described.

In moving the table —G— toward the cutters the stick held between the centers, 11 and 12, slides along on the elevated ends of the levers —A′—A′— and thereby depresses the same and causes them to bear with increased pressure on the under side of the stick which thus receives additional support. The central portion of the stick also becomes supported by riding upon the rest—C′—during the operation of the cutters.

The arbor 1, cam-shaft, 3, and head center, 11, receive motion by the following means: To the arbor, 1, is attached the driving pulley —a— which is connected by a belt with a suitable motor not shown. To the base of the frame —A— is firmly secured a horizontal journal-box —E— through which passes a counter-shaft, 7, to the outer end of which is fastened the cone pulley —c—, which is connected by a belt —c′— with a smaller cone-pulley —b— attached to the end of the arbor —1. The ends of the journal box —E— are formed with tubular trunnions on which ismounted the standard —F— which is thus permitted to swing in a vertical plane with its upper end toward and from the arbor. In bearings on opposite ends of the standard —F— is journaled a vertical shaft, 8, to the lower end of which is affixed a worm-wheel —i— engaging a worm —i′— fastened to the horizontal shaft, 7. To the upper end of the vertical shaft, 8, is attached a worm —h— which, in swinging the standard —F— back and forth, is adapted to engage and release a worm-wheel —j— attached to the cam-shaft 3. They are held in engagement by means of a bell-crank lever —W— pivoted at the junctions of its arms to the crank-shaft, 3, and connected to the upper end of the standard —F— by a curved link, 28, pivoted to the horizontal arm of the lever, W, and to the standard as shown. The points of connections of said link are normally in a line passing through the center of the shaft, 3, and thus resisting the strain which tends to crowd them apart. The free end of the horizontal arm of said lever is weighted to draw the standard —F— toward the frame —A— and thus hold the worm —h— in engagement with the worm-wheel —j. The vertical arm —z′— of the lever —W— is yieldingly connected to the frame —A— by means of a rod, 36, extending from said arm rearward and passing freely through a stud-pin —R— secured to the frame —A. A spiral spring, 30, surrounding the rear end portion of the rod and bearing with one end on a collar affixed to said end of the rod and with the opposite end against the stud-pin —R— draws the arm —z′— of the lever —W— rearward. As the table —G— is drawn forward or from the cutters the rod is caused to exert a greater pull on the arm —z′— of the lever —W— and tends to turn said lever so as to lift the horizontal arm thereof and cause the same to throw the worm —h— out of gear by means of the link, 28. This tendency, however, is regulated by means of a mechanism which permits the release of the aforesaid worm at a predetermined point of the revolution of the cam-shaft, 3. Said regulating mechanism consists of a cam —G′—attached to the shaft, 3. A short rock-shaft, 37, mounted in a bearing on the table —G— has affixed to it an arm —F′— the free end of which engages said cam —G′— and is thus intermittently oscillated. To the same rock-shaft is also fastened a lever —E′— which extends forward and rearward and is weighted at its rear end, and normally abuts with its front end against a shoulder —R′— on the lower end of the arm —z′— and thus prevents the lever —W— from lifting and throwing the worm —h— out of gear. When the table —G— is drawn away from the cutters, the spring 30, is under sufficient tension to actuate the lever —W— so as to cause it to throw the worm out of gear, but the engagement of the lever —E′— with the shoulder —R′— locks the lever —W— until the cam —G′— of the revolving shaft, 3, depresses the arm —F′— which turns the rock-shaft, 37, so as to throw the lever —E′— out of engagement with the shoulder —R′—. The lever —W— being thus released, swings on its axis and throws the worm out of gear by means of the link, 28. The motion of the cam-shaft, 3, and head-center, 11, which also receives motion from the worm as hereinafter described, is thereby arrested. In pushing the table —G— back toward the cutters the spring, 30, becomes relieved from tension sufficiently to allow the bell-crank lever, W, to resume its normal position and draw the standard —F— toward the frame —A— and thereby throw the worm —h— in gear with the worm-wheel —j— which then transmits motion to the cam-shaft, 3, and head or driving center, 11. The shaft of said driving center has affixed to it a pinion —f— which receives motion from a gear —d— on the cam-shaft, 3, by an intermediate gear, e, which is supported on two arms —e′—e′— connected respectively to the shaft of the driving center, 11, and to the cam-shaft, 3.

The operation of the described lathe or machine is as follows: The arbor to which the cutter-heads are attached is rotated at a high rate of speed while the driving center, 11, and cam-shaft, 3, receives a slow and synchronous motion. The table G— is drawn away from the cutters and in this movement the cam-shaft, 3, and driving center are stopped automatically by the action of the lever —W— and its link-connection, 28, with the shaft, 8, of the work gears. The work is then placed upon the levers —A'—A'— and against the stops—A" and in this condition it is brought axially in line with the two centers 11 and 12. The tail center 12 having in the meantime been retracted by the lever 41, as before described, to allow the work to be introduced between said centers, the operator then releases said tail-center by operating the lever, 46, and thus the tail center automatically engages the end of the work or stick supported on the levers —A'—A'. The operator then moves the table —G— toward the cutters by means of the lever, 5, and, if the work to be produced by the cutters is coarse or of a character which does not require great care in its treatment, the feeding may be completed by means of said lever, but if the work to be turned out requires a very careful feed to the cutters, the operator throws the feed-screw, 9, into engagement with the half-nut —n"— and turns the hand-wheel attached to the front end of the feed-screw. In moving the table —G— toward the cutters the horizontal arm of the lever, 41, passes under the pivoted track 43, which yields and leaves said lever undisturbed. At the same time the lever —W— throws in gear the cam-shaft, 3, and driving center, 11, which then rotate in unison. The cams —B'— which are attached to said cam-shaft and are shaped according to the shape to be imparted to the stick fed to the cutters, operating against the shoes —H— on the spring-restrained head and tail centers, imparts a horizontal vibratory motion to the table —G. The vibratory motion of the centers imparts the desired shape to the stick. When completed the operator draws the table —G— toward the front by means of the lever, 5, and in this movement the cam-shaft, 3, and driving center, 11, are again thrown out of gear and set at rest. At the same time the horizontal arm of the lever, 41, travels over the top of the pivoted track, 43, and thus draws the tail-center out of the work.

Having described my invention, what I claim as new, and desire to secure by Letters Patent, is—

1. In combination with the stationary frame and rotary cutter-arbor mounted on bearings fixed to said frame, stationary ways on the frame at right angles to the aforesaid arbor, a feed-table sliding on said ways, rotary work-holding centers mounted on said table, vibratory independently thereof, a revoluble shaft journaled in bearings on said table, and cams attached to said shaft and imparting vibratory motion to the aforesaid centers, as set forth.

2. In combination with the arbor carrying the cutter-heads and a feed-table movable toward and from the cutter-heads, rotary working-holding centers mounted on said table and vibratory independently thereof, a rotary shaft carried on the table, cams affixed to said shaft and imparting vibratory motion to the aforesaid centers, a vertical rotary shaft adapted to swing with its upper end toward and from the aforesaid arbor, and gears transmitting motion from the vertical shaft to the aforesaid cam-shaft and head-center as set forth.

3. In combination with the arbor and the work-holding driving center, a horizontal counter-shaft receiving motion from the arbor, a worm attached to said counter-shaft, a vertical shaft, a worm wheel on the lower end of said shaft engaging the aforesaid worm, a worm on the upper end of the vertical shaft, and gears transmitting motion from the latter worm to the aforesaid driving center, as set forth.

4. In combination with the arbor carrying the cutter-heads, the feed-table movable toward and from said cutter-heads, work-holding centers mounted on said table and vibratory toward and from the cutter-heads independent of the table, a shaft mounted on said table parallel with the aforesaid arbor, cams affixed to said shaft and imparting vibratory motion to the work holding centers, a horizontal counter shaft receiving motion from the aforesaid arbor, a vertical shaft adapted to swing with its upper end toward and from the arbor, worm-gears transmitting motion from the counter shaft to the vertical shaft, a worm on the upper end of the vertical shaft, a worm-wheel on the aforesaid cam shaft meshing with the latter worm, and gears transmitting motion from said cam-shaft to the work-holding driving center as set forth.

5. In combination with the frame, the arbor carrying the cutter-heads, and the feed-table movable toward and from said cutter-heads, work-holding centers mounted on said table, a shaft mounted in bearings on the same table parallel with the aforesaid arbor, gears transmitting motion from said shaft to the head-center, a worm-wheel on said shaft, a vertical rotary shaft adapted to swing toward and from the aforesaid arbor, a worm on the vertical shaft adapted to engage and release the aforesaid worm-wheel, a bell-crank lever holding by one of its arms said worm normally engaged with the worm-wheel, and a rod connecting the other arm of said lever to the frame and causing said lever to throw the worm out of gear during the movement of the table from the cutter-heads as set forth.

6. In combination with the frame, the arbor carrying the cutter-heads, and the feed-table movable toward and from the cutter-heads, work-holding centers mounted on said table and vibratory independent thereof, a shaft mounted on the same table parallel with the arbor, cams on said shaft vibrating said centers, gears transmitting motion from said shaft to the head center, a worm-wheel on the cam-shaft, a vertical arm adapted to swing with its upper end toward and from the arbor, a vertical rotary shaft journaled on said arm, a worm on said shaft adapted to engage and release the aforesaid worm-wheel, a bell-crank lever mounted on the aforesaid cam-shaft, a link connecting one arm of said lever to the upper end of the aforesaid vertical rod, and a rod connecting the other arm of the bell-crank-lever to the frame as set forth.

7. In combination with the frame, arbor, feed-table and work-holding centers mounted on said table, the shaft, 3, gears transmitting motion from said shaft to the head-center, the cam —G'— and worm-wheel —j— fixed to the same shaft, the vertical arm —F— adapted to swing with its upper end toward and from the arbor, the rotary shaft, 8, journaled on said arm, the worm —h— on said shaft engaging the wheel —j—, the bell-crank lever —W—, the link, 28, connecting the horizontal arm of said lever to the arm —F—, the spring-restrained rod, 36, connecting the vertical arm of the lever to the frame, the arm —E'— pivoted to the feed-table and adapted to engage and release the vertical arm of the lever —W—, and the arm —F'— actuated by the cam —G'— and connected with the arm —E'— to throw the same out of engagement with the lever —W—, all combined to operate as set forth.

8. In combination with the frame and cutter-arbor mounted thereon ways extending from the frame at right angles to said arbor, the feed-table mounted on said ways, a half-nut attached to said table, the screw-shaft, g, pivoted at one end to the frame, at right angles to the arbor and provided at the opposite end with the hand-wheel —l—, the two-armed lever —X'— mounted on said screw-shaft, and the link, 29, connected to the lever —X'— beneath the screw-shaft and to a support —6— on the frame above said shaft to maintain the nut in engagement as set forth and shown.

9. In combination with the frame —A— and arbor —1—, the ways —D—D— formed with rearward and upward extensions, the feed-table mounted on said ways, the shaft, 2, fastened to the extensions, the finger —D'— rigidly attached to said shaft, the rest —C'— mounted loosely on the shaft, and the spring, 34, and screw, 38, supporting said rest on the aforesaid finger, as set forth.

10. In combination with the frame —A—, cutter-arbor —1— and ways —D—D—, the table —G— provided with the guide —m— and the head-block and tail-block each composed of a base mounted on said guide and formed with the transverse tongue —n— on its top, a block grooved correspondingly in its under side and mounted on said base and provided with the work-holding center, a spring forcing said block toward the arbor, the rotary shaft, 3, mounted on the table, and cams on said shaft pushing the two center carrying blocks in opposition to the action of the springs as set forth.

11. In combination with the frame —A—, cutter-arbor —1— and ways —D—D—, the table —G— provided with the guide —m—, the base —J— mounted on said guide and formed with the dove-tail tongue —n— on its top, and with the groove —n'— and lug —t— in said tongue, the block —I— carrying the driving center, 11, and provided with a dove-tail groove receiving through it the aforesaid tongue, the screw —t''— passing freely through the outer end of the block —I— and through the lug —t—, and provided with a nut on its inner end, the spring —s'— interposed between said nut and lug, the rotary shaft, 3, mounted on the table, and the cam —B'— attached to said shaft and vibrating the block —I— in opposition to the spring —s'— as set forth.

12. In combination with the arbor —1—, the feed-table provided with the guide —m—, and the shaft 3, mounted on said table and provided with the cam —B'—, the base —J— mounted on the aforesaid guide, the block —I— mounted on said base movably toward and from the arbor, a spring forcing said block toward the arbor, and the shoe —H— attached to said block adjustably in relation to its distance from the cam —B'— as set forth.

13. In combination with the arbor —1—, the feed-table and the shaft, 3, mounted on said table, the block —I— mounted on said base, balls —p—p— interposed between said block and base, a spring forcing the block —I— toward the arbor, and the cam —B'— attached to shaft, 3, and vibrating the block —I— in opposition to the spring as set forth.

14. In combination with the arbor —1—, feed-table —G— and cam-shaft, 3, mounted on said table, the tail-block composed of the base —J— secured to said table, the vibrating block —K— mounted on said base, and the center-carrying block —L— mounted on the vibrating block movably toward and from the head-block as set forth.

15. In combination with the arbor —1—, feed-table —G— and cam-shaft, 3, mounted on said table, the base —J— secured to the table, the vibrating block —K— mounted on said base, the block —L— riding on the vibrating block in a line parallel with the axis of the lathe, a spring forcing the block —L— toward the head-block, and a lever pivoted to the vibrating block and engaging the block L to retract the same in opposition to its spring as set forth.

16. In combination with the frame —A— and arbor —1—, the ways —D—D—, the table —G— mounted on said ways, the head-block and tail block mounted on the table, the shaft, 6, attached to the front ends of the ways, the arms z, z, fixed to said shaft, the levers —A'—A'— pivoted to the upper ends of said arms, tension-springs, 32, connecting the front ends of said levers to the feet of the arms, and shoulders —A''—A''— connected to the levers adjustably lengthwise thereof as set forth.

17. In combination with the frame, cutter arbor, and feed-table movable toward and from said arbor, the tail center movable parallel with the axes of the arbor, a spring forcing said tail center toward the head-center, the lever 27, adapted to retract the tail center, the cradle 40, attached to the feed-table, the three-armed lever, 41, pivoted to said cradle and having its upwardly extending arm connected with the lever, 27, the bridge, 42, pivoted track 43, traversed by the horizontal arm of the lever, 41, and the latch 45 adapted to engage and release the downwardly extending arm of the lever, 41, all combined to operate as set forth.

18. In combination with the cutter-arbor, and work carrying centers movable toward and from said arbor, the shaft, 2, shield —Y— under head rest —C'—, yoke 101, over head-rest, 102, and the set-screw 105, connected to said yoke and resting on the shield to sustain the free end of the yoke as set forth.

In testimony whereof I have hereunto signed my name this 12th day of January, 1893.

LOUIS G. MERRITT. [L. S.]

Witnesses:
ISAAC E. MERRITT,
FRED D. MOYER.